United States Patent [19]
Harbison et al.

[11] 3,911,523
[45] Oct. 14, 1975

[54] UNIVERSAL REFILL

[75] Inventors: William H. Harbison; Michael G. Mohnach, both of Merrillville, Ind.

[73] Assignee: The Anderson Company, Gary, Ind.

[22] Filed: Mar. 11, 1974

[21] Appl. No.: 449,830

[52] U.S. Cl. ............................................ 15/250.42
[51] Int. Cl.² ............................................. B60S 1/04
[58] Field of Search ...................... 15/250.36–250.42

[56] References Cited
UNITED STATES PATENTS

| | | | |
|---|---|---|---|
| 3,421,175 | 1/1969 | Roberts | 15/250.42 |
| 3,820,188 | 6/1974 | Moorhead et al. | 15/250.42 |

*Primary Examiner*—Peter Feldman
*Attorney, Agent, or Firm*—Wegner, Stellman, McCord, Wiles & Wood

[57] ABSTRACT

A windshield wiper blade structure of a design capable of assembly with most all of the known pressure-distributing superstructures having claws adapted to engage said blade structure at longitudinally spaced portions. The blade structure has a resilient wiping element assembled with a flexible backing member or holder which backing member has a pair of upwardly projecting and longitudinally extending reinforcing ribs spaced apart a sufficient distance to permit unrestricted assembly of superstructures of various manufacturers.

5 Claims, 7 Drawing Figures

UNIVERSAL REFILL

BACKGROUND OF THE INVENTION

The present invention relates to a flexible backing member or holder for a resilient wiping element in a windshield wiper apparatus and more particularly to reinforcing members for said backing member or holder.

DESCRIPTION OF THE PRIOR ART

In the business of installing and replacing windshield wiper blades, it has become well accepted to replace only the worn blade structure which includes the backing member and resilient wiping member. The replaceable blade structure, generally called a "refill" is designed to be usable with as many different types of pressure-distributing superstructures as is possible. Occasionally, one manufacturer will modify a construction of a superstructure so that it will not accept a refill of another competing manufacturer. Currently, there are universal-type refills on the market that can be used with a large number of outstanding wiper blade superstructures but, unfortunately, there are some superstructures that will not fit the universal refill.

SUMMARY OF THE INVENTION

The present invention is directed to the structure of an improved refill that is more universal in nature than heretofore and is adapted to fit a wide variety of superstructures of different configurations. In the windshield wiper field, there are many variations of pressure-distributing superstructures all originating with the invention of John W. Anderson as covered by U.S. Pat. No. 2,596,063 issued May 6, 1952. The outboard end of the yokes of the many variations of the superstructures have different shapes. Some have a downturned abutment, some have a button, some have a downwardly struck tab, and the like.

The abutments, buttons and tabs each present a different problem when it comes to provide one refill unit that is adapted to be assembled with all such constructions. The present invention has taken into consideration each form of obstruction on the various, more popular superstructures and does provide a cross-sectional configuration of the backing member of the refill that allows clearance for passage of those superstructures requiring clearance and provides abutment surfaces where such surfaces are needed so that a truly universal refill is provided.

BRIEF DESCRIPTION OF THE DRAWINGS

The details of construction and operation of the invention are more fully described with reference to the accompanying drawings which form a part hereof and in which like reference numerals refer to like parts throughout.

In the drawings.

DETAILED DESCRIPTION OF THE PREFERRED EMBODIMENT

Figure 1:
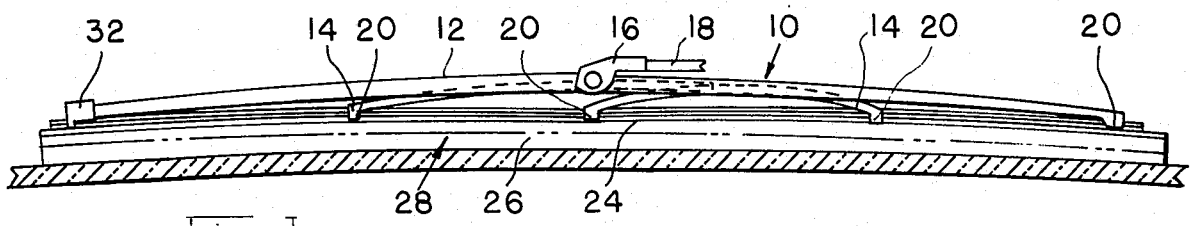
FIG. 1 is a side elevational view of a windshield wiper apparatus embodying the principles of the present invention.

Referring now to the drawings in more detail, a superstructure 10 includes a primary yoke member or bridge member 12 interconnected with one or more articulated secondary yoke members 14. The order and form of superstructure 10 can be any one of the well known types on the market such as is shown and described in many patents including U.S. Pat. No. 3,035,298 to Scinta and U.S. Pat. No. 2,953,804 to Roberts et al. The blade includes a connector 16 which is adapted to be assembled with the end of a wiper arm 18 for conventional windshield wiping applications. The opposite ends of the secondary yokes 14 are formed with claws as at 20 engaging the edges of a backing member 24 carrying a wiping element 26. The backing member 24 and wiping element 26, when assembled together, comprise a blade structure 28. The outboard ends of the secondary yokes 14 include downwardly struck tabs or projections 30 for engaging with certain forms of end clips (of a type not shown) for releasably locking the blade structure 28 on the superstructure 10. In the present form of invention, an end clip 32 is illustrated which holds the superstructure 10 on the blade structure 28 as is shown and described in pending application Ser. No. 328,648 filed Feb. 1, 1973 and assigned to the common assignee of the present application.

The backing member 24 is preferably of extruded flexible plastic material such as glass reinforced polycarbonate, and includes a central tubular portion 34 having a chamber 36 which functions as a receiver for a retaining bead on the wiping element 26. The chamber 36 is somewhat triangular in cross-sectional configuration and a relatively narrow slot 38 opens into the chamber along the bottom of the tubular portion 34. The wiping element 26 is preferably made of relatively soft resilient rubber-like material and includes a relatively thin wiping edge 40, a thicker intermediate portion 42, a relatively thin neck portion 44 and an enlarged retention bead 46 along the upper edge. In use, the wiping element 26 is attached to the backing member 24 with the retention bead 46 of the wiping element disposed in the receiver chamber 36, and with the relatively thin neck portion 44 of the wiping element disposed in the receiver slot 38. As illustrated, the retention bead 46 has a generally triangular cross section which is complementary to the receiver chamber 36. The wiping element 26 is attached to the backing member 24 by threading the bead 46 into the receiver chamber 36.

The backing member 24 is relatively wide and relatively thin, and includes a pair of opposed rails or flanges 48 extending laterally outwardly in opposite directions from the slot 38 at the bottom of the tubular portion 34. Each flange 48 is provided along the outside edge with an upwardly directed flange 50 which functions to reinforce or strengthen the flange 48 along the outer edge so as to add resistance to flexing of the backing member 24 in a plane perpendicular to the windshield. It should be noted that although the flange 50 adds resistance to flexing of the backing member in the plane perpendicular to the surface of the windshield, the backing member is intended to flex in said direction perpendicular to the windshield but in a controlled fashion. As illustrated, each of the flanges 50 includes an outwardly directed rib 52 which is located on the vertical center of gravity of the backing member. Due to the location of the ribs 52, stiffness is added to the flexor or backing member in the plane parallel to the windshield but said ribs do not add stiffness to the backing member in the plane perpendicular to the windshield. Above the flanges 48, the tubular portion 34 is formed with outwardly directed flanges 54 which are spaced vertically from the flanges 48 and are spaced laterally from the flanges 50 in a manner to form openings 56 between flanges 50 and the edges of flanges 54 and forms slots 58 between flanges 54 and 48 for receiving the claws 20 of the secondary yokes 14.

Figure 7:
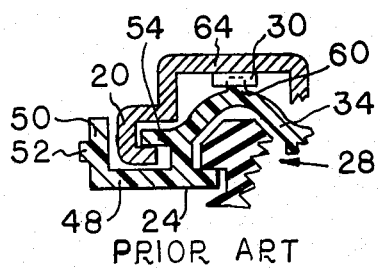

The structure of the backing member 24 and wiping element 26, just described, comprises the prior art and is disclosed and claimed in application Ser. No. 328,649 filed Feb. 1, 1973 and assigned to the common assignee of the present application. As is also described in said application Ser. No. 328,649 and as shown in FIG. 7 thereof as the prior art, the top of the tubular portion 34 is formed with a longitudinal reinforcing rib 60 which limits the capacity of the tubular portion to collapse against the retention bead 46 of the flexible wiping member.

In practice, it was found that the single upstanding rib 60, although providing the desired resistance to flexing of the backing member, interfered with certain structural elements of some commercially available superstructures. That is, superstructures of the type shown in FIGS. 1 and 2 have the tabs or projections 30 struck downwardly from the central portion of the outer ends of the secondary yokes so that one end 62 of the tab is hinged or connected to the back 64 of each secondary yoke and the other end 66 projects downwardly therefrom into the open space between the sides 68, 70 of said secondary yoke. The end 66 of the tab 30 interfered with the upstanding rib 60 on the backing member 24 thereby preventing assembly of the blade structure 28 with the superstructure.

Figure 3:
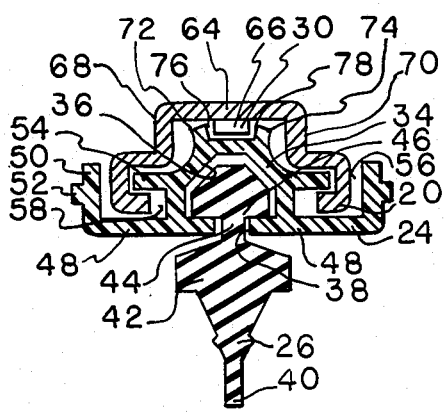
FIG. 3 is a cross-sectional view taken along the lines 3—3 of FIG. 2.
Figure 2:
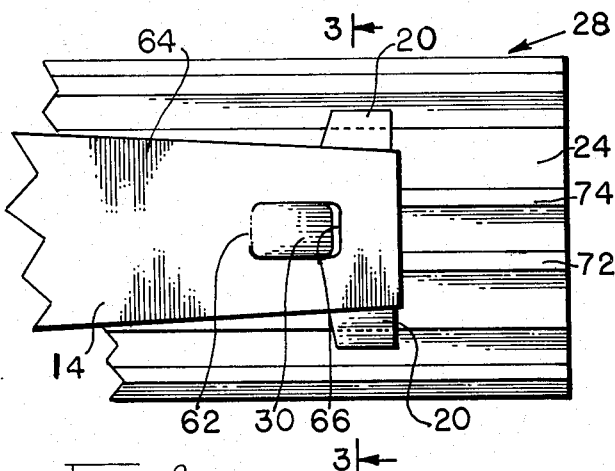
FIG. 2 is a fragmentary top plan view of the right-hand end portion of the blade structure shown in FIG. 1, including backing member and wiping element, with one pair of claws assembled with the backing member.
Figure 4:
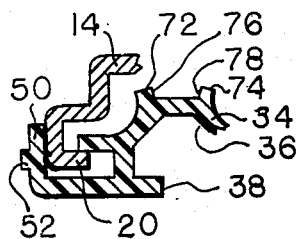
FIG. 4 is a partial end elevational view of the apparatus shown in FIG. 3, with the claws of one end of one yoke of the superstructure shown in cross-section and in a different position than in FIG. 3.

As shown in FIGS. 2, 3 and 4, the tubular portion 34 of the backing member 24 is provided with a pair of upwardly projecting, spaced apart ribs 72, 74 which ribs lie parallel to each other and extend the full longitudinal length of the backing member. The inner facing surfaces 76, 78, respectively, of the ribs 72, 74 are spaced apart a distance slightly greater than the width of the tabs or projections 30 so that during assembly of the superstructure with the backing member 24, the tab 30 will align with the opening between the ribs and pass freely therebetween as the superstructure and backing member are moved relative to each other. The two ribs 72, 74 add stiffness to the backing member in the direction parallel to the surface being wiped thereby combining with the flanges to substantially prevent bowing of the backing member parallel to the surface being wiped. The ribs 72, 74 add resistance to flexing of the backing member in a direction perpendicular to the surface being wiped so that the backing member will not distort in the regions where pressure is applied by the claws of the superstructure resulting in a better wipe of the surface. The spaced ribs 72, 74 also resist twisting of the backing member from end to end thereby further improving the resultant wipe of the surface.

The openings 56 between the edges of the flanges 54 and the inner walls of the upward flanges 50 are computed to be of a size that all known popular style superstructures with claws that will fit into the openings 56 with their inturned ends in the slots 58 so that the minimum spaced and maximum spaced claws will either nest relatively close to the edges of the flanges 54 or the outside edges of the claws will engage the insides of the flanges 50, see FIG. 4, respectively. In any set of conditions, the claws will not disengage from the flanges 54.

In assembly of the apparatus, as illustrated in FIG. 1, the blade structure, including the backing member 24 and the wiping element 26, is attachable to the secondary yokes 14 by insertion of the claws 20 of yokes 14 into the slots 58 at the end of the backing member. The claws 20 fit loosely enough in the slots 58 so that the backing member is slidable relative to the claws to longitudinally position the backing member properly relative to the superstructure. The tab 30 on the outer end of each yoke 14 aligns with the opening between the ribs 72, 74 so that the yokes and, therefore, the superstructure is threaded onto the blade structure with all claws engaging the edges of the backing member. The end clip 32 is snapped in place on the one end of the superstructure and on the backing member for holding the superstructure assembled with the blade structure.

Figure 5:
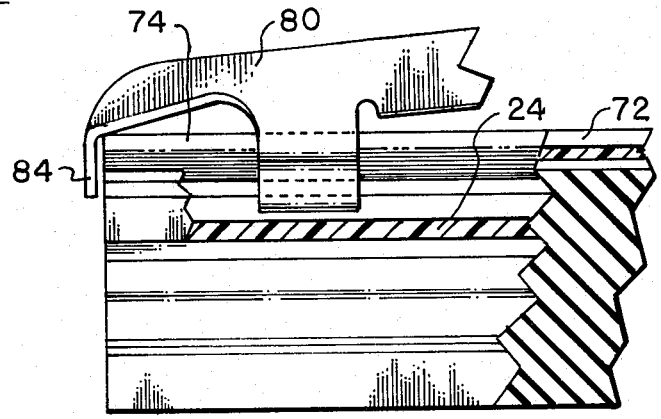
FIG. 5 is a fragmentary side view of a different form of superstructure assembled with the improved blade structure with part of the backing member broken away.
Figure 6:
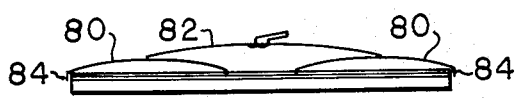
FIG. 6 is a schematic elevational view of the form of superstructure and blade structure shown in FIG. 5; and, FIG. 7 is a partial end elevational view showing the interference between the form of superstructure shown in FIGS. 1 and 2 and the prior art backing member.

As shown in FIGS. 5 and 6, backing member 24 with the ribs 72, 74 can be assembled effectively with other popular superstructures wherein the downwardly directed end portion 84 on the outer end of the yokes 80 engage with the ends of said pair of ribs 72, 74 to limit the extent of longitudinal movement of the backing member relative to the secondary yokes and prevent removal of the backing member and wiping element from the superstructure. The assembly of the apparatus, as shown in FIG. 6, is facilitated by disconnecting one secondary yoke 80 from the end of a primary yoke 82, so that the secondary yoke 80 may be assembled on the backing member from the left end as viewed in FIG. 6, and the other secondary yoke 80 may be assembled on the backing member from the right end as viewed in FIG. 6, after which the left-hand secondary yoke 80 is again attached to the end of the primary yoke 82. The just described manner of assembly of a superstructure to a blade structure is shown in U.S. Pat. No. 2,948,011 and in other prior devices.

The wiping element 26 is assembled with the backing member 24 in any one of the known fashions such as by sliding the retention bead 46 into the end of the receiver chamber 36 in the central tubular portion 34, while the relatively thin neck portion 44 of the wiping member is inserted into the slot 38 in the bottom of the receiver. Preferably, some suitable means is utilized for releasably retaining the wiping member against substantial longitudinal movement relative to the backing member so that the parts do not become disassembled unintentionally.

A wiper of the type illustrated is adapted for cleaning curved and flat windshields on moving vehicles such as automobiles, airplanes and the like. The superstructure, including pressure-distributing yokes 12 and 14, transmits pressure from a spring-pressed wiper arm 18 to the flexible backing member 24 and wiping element 26. As a result of the pressure distributed through the yokes, the backing member tends to conform to the general curvature of the windshield. As the wiper assembly is moved back and forth over the windshield, the wiping element conforms to the constantly changing contours of the windshield.

We claim:

1. A windshield wiper assembly for a windshield, comprising,
   a. a pressure-distributing superstructure having claws adapted to engage a blade structure at longitudinally spaced positions,
   b. an elongate flexible tubular holder having a longitudinal chamber and a relatively narrow slot opening into the chamber along the bottom of the holder,
   c. a pair of opposed lower flanges extending laterally outwardly on the holder in opposite directions from the bottom of said holder,
   d. a pair of opposed upper flanges extending laterally outwardly in opposite directions on the holder in spaced relation above the lower flanges to define laterally opening slots for receiving the claws of said superstructure,
   e. a resilient wiping element having a wiping edge, a relatively thin neck portion disposed in said slot, and an enlarged retention bead along the upper edge disposed in said chamber, and
   f. a pair of continuous spaced apart upstanding ribs formed on the upper surface of said tubular holder, said ribs being symmetrically disposed on opposite sides of the longitudinal center of said holder and extend throughout the longitudinal length of said holder for adding stiffness to the tubular holder.

2. The assembly of claim 1 wherein said superstructure has a downturned tab near one outer end portion thereof and said tab passing between said ribs without interference therefrom.

3. The assembly of claim 1 wherein said superstructure has downturned outer end portions which downturned portions engage the ends of said ribs for retaining said superstructure assembled on said holder.

4. An elongate backing member adapted to be attached to a superstructure for holding a flexible windshield wiping element, comprising,
   a. a tubular receiver having a longitudinal chamber for holding a retention bead on said wiping element,
   b. the bottom of the receiver having a relatively narrow longitudinal slot opening into the chamber,
   c. a pair of opposed flanges extending laterally outwardly in opposite directions from the bottom of the receiver,
   d. a second pair of opposed flanges extending laterally outwardly in opposite directions on the receiver in vertically spaced relation above said first flanges to define laterally opening slots for receiving the claws of a superstructure, and
   e. a pair of spaced apart upstanding ribs formed on the upper surface of and extending throughout the length of said tubular receiver for adding stiffness to said backing member, said ribs being symmetrically disposed with respect to the longitudinal center of said tubular receiver for permitting a projecting member on said superstructure to pass therebetween without interference.

5. An elongate backing member as defined in claim 4, including a pair of upwardly directed flanges, each upwardly directed flange being connected to the outer edge of one of said first-named flanges and providing an opening between said upwardly directed flange and the outer edge of one of said second flanges.

* * * * *